US010500721B2

(12) United States Patent
Takamizawa

(10) Patent No.: US 10,500,721 B2
(45) Date of Patent: Dec. 10, 2019

(54) MACHINE LEARNING DEVICE, LAMINATED CORE MANUFACTURING APPARATUS, LAMINATED CORE MANUFACTURING SYSTEM, AND MACHINE LEARNING METHOD FOR LEARNING OPERATION FOR STACKING CORE SHEETS

(71) Applicant: FANUC CORPORATION, Yamanashi (JP)

(72) Inventor: Suguru Takamizawa, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 350 days.

(21) Appl. No.: 15/368,753

(22) Filed: Dec. 5, 2016

(65) Prior Publication Data

US 2017/0157767 A1  Jun. 8, 2017

(30) Foreign Application Priority Data

Dec. 7, 2015  (JP) ................................. 2015-238410

(51) Int. Cl.
*B25J 9/16* (2006.01)
*B25J 9/00* (2006.01)
*G06N 3/08* (2006.01)
*H05K 3/46* (2006.01)

(52) U.S. Cl.
CPC ............. *B25J 9/163* (2013.01); *B25J 9/1697* (2013.01); *G06N 3/08* (2013.01); *Y10S 901/03* (2013.01)

(58) Field of Classification Search
CPC ........ B25J 9/163; B25J 9/1687; B25J 9/1697; G05B 2219/39271; G05B 2219/35055; G06N 3/08; Y10S 901/03
See application file for complete search history.

(56) References Cited

U.S. PATENT DOCUMENTS

| 7,792,609 B2 * | 9/2010 | Strasser | B65H 7/12 271/14 |
| 8,982,217 B1 * | 3/2015 | Hickman | H04N 7/185 348/158 |
| 8,985,936 B2 | 3/2015 | Rankin et al. | |

(Continued)

FOREIGN PATENT DOCUMENTS

| JP | 63-314606 A | 12/1988 |
| JP | 2-54507 A | 2/1990 |

(Continued)

OTHER PUBLICATIONS

Wunsch; "Real-time pose estimation of 3-D objects from camera images using neural networks"; Proceedings of the 1997 IEEE International Conference on Robotics and Automation; vol. 4; pp. 3232-3237; 1997\ (Year: 1997).*

*Primary Examiner* — Robert T Nguyen
(74) *Attorney, Agent, or Firm* — Hauptman Ham, LLP

(57) ABSTRACT

A machine learning device which learns an operation of a laminated core manufacturing apparatus for stacking a plurality of core sheets to manufacture a laminated core, wherein the machine learning device includes a state observation unit which observes states of the core sheets and the laminated core manufacturing apparatus; and a learning unit which updates a manipulated variable for stacking the core sheets, on the basis of a state variable observed by the state observation unit.

12 Claims, 6 Drawing Sheets

(56) References Cited

U.S. PATENT DOCUMENTS

| | | | |
|---|---|---|---|
| 9,126,770 B1* | 9/2015 | Widder | B65G 57/02 |
| 9,873,230 B1* | 1/2018 | DesJardien | B29C 70/388 |
| 9,908,292 B2* | 3/2018 | Moore | B33Y 10/00 |
| 2004/0240981 A1* | 12/2004 | Dothan | B65G 49/067 |
| | | | 414/795.4 |
| 2006/0099064 A1* | 5/2006 | Anaki | B25J 9/0084 |
| | | | 414/797 |
| 2011/0024051 A1* | 2/2011 | Sanford | B25J 9/1687 |
| | | | 156/355 |
| 2013/0010081 A1* | 1/2013 | Tenney | A61B 34/30 |
| | | | 348/47 |
| 2014/0026398 A1* | 1/2014 | Watanabe | B32B 38/18 |
| | | | 29/623.1 |
| 2018/0079076 A1* | 3/2018 | Toda | G06N 3/008 |
| 2018/0169856 A1* | 6/2018 | Murakami | B25J 9/161 |
| 2018/0222046 A1* | 8/2018 | Gotou | G06N 3/008 |
| 2018/0225113 A1* | 8/2018 | Hasegawa | B25J 9/163 |
| 2018/0276933 A1* | 9/2018 | Nakanishi | B65G 47/493 |
| 2018/0281180 A1* | 10/2018 | Yamamoto | B25J 9/163 |
| 2018/0293498 A1* | 10/2018 | Campos | G06F 8/31 |
| 2019/0160578 A1* | 5/2019 | Nakagawa | B23K 9/0953 |

FOREIGN PATENT DOCUMENTS

| | | |
|---|---|---|
| JP | 5-233042 A | 9/1993 |
| JP | 6-203166 A | 7/1994 |
| JP | 7-192946 A | 7/1995 |
| JP | 11-26271 A | 1/1999 |
| JP | 2005-78516 A | 3/2005 |
| JP | 2006-110702 A | 4/2006 |
| JP | 2008-302449 A | 12/2008 |
| JP | 2010166664 A | 7/2010 |
| JP | 2012-61567 A | 3/2012 |
| JP | 2013-180369 A | 9/2013 |
| JP | 2013-208702 A | 10/2013 |
| JP | 2013-225192 A | 10/2013 |
| JP | 2013-242761 A | 12/2013 |
| JP | 2014-27100 A | 2/2014 |
| JP | 2015061353 A | 3/2015 |
| JP | 2015-185149 A | 10/2015 |

* cited by examiner

MACHINE LEARNING DEVICE, LAMINATED CORE MANUFACTURING APPARATUS, LAMINATED CORE MANUFACTURING SYSTEM, AND MACHINE LEARNING METHOD FOR LEARNING OPERATION FOR STACKING CORE SHEETS

RELATED APPLICATIONS

The present application claims priority to Japanese Patent Application Number 2015-238410, filed Dec. 7, 2015, the disclosure of which is hereby incorporated by reference herein in its entirety.

BACKGROUND OF THE INVENTION

1. Field of the Invention

The present invention relates to a machine learning device, a laminated core manufacturing apparatus, a laminated core manufacturing system, and a machine learning method for learning an operation for stacking core sheets.

2. Description of the Related Art

Conventionally, a laminated core is manufactured by, e.g., sequentially stacking a plurality of core sheets using a laminated core manufacturing apparatus including a robot. Core sheets are stacked using the robot by, e.g., gripping the core sheets with its hand portion using a teach pendant and storing the moving path and the like in a robot control unit, or causing the robot control unit to execute a predetermined program for gripping, moving, and stacking the core sheets.

Various proposals have been conventionally made for laminated core manufacturing apparatuses and laminated core manufacturing methods which can accurately manufacture laminated cores (e.g., Japanese Laid-Open Patent Publication Nos. 2015-061353 and 2010-166664).

As described above, a laminated core is manufactured by, e.g., gripping core sheets with the hand portion using a teach pendant and storing the moving path and the like in a robot control unit, or causing the robot control unit to execute a predetermined program. Since a laminated core manufactured using such a method includes predetermined deviations (stacking errors), a mold jig, for example, is used to manufacture a laminated core with higher accuracy.

However, a plurality of mold jigs are provided because a different mold jig is used for each type of laminated core to be manufactured, and the use of the same mold jigs over an extended period of time results in subtle changes in their dimension and shape and, in turn, influences the shape of manufactured laminated cores.

It is an object of the present invention to provide a machine learning device, a laminated core manufacturing apparatus, a laminated core manufacturing system, and a machine learning method which can continuously manufacture high-quality laminated cores, in consideration of the above-described conventional problem.

SUMMARY OF INVENTION

According to a first aspect of the present invention, there is provided a machine learning device which learns an operation of a laminated core manufacturing apparatus for stacking a plurality of core sheets to manufacture a laminated core, wherein the machine learning device includes a state observation unit which observes states of the core sheets and the laminated core manufacturing apparatus; and a learning unit which updates a manipulated variable for stacking the core sheets, on the basis of a state variable observed by the state observation unit.

The state observation unit is preferable to observe a state variable (state quantity) representing at least one of shape data of the core sheets, operation data of the laminated core manufacturing apparatus, and time data for stacking the core sheets by the laminated core manufacturing apparatus, and the learning unit is preferable to update the manipulated variable for stacking the core sheets, on the basis of the state variable representing the at least one of the shape data of the core sheets, the operation data of the laminated core manufacturing apparatus, and the time data for stacking the core sheets, observed by the state observation unit.

The laminated core manufacturing apparatus may include a robot including a robot vision system attached to one of a hand portion and an area which provides a broad view of a workspace, and the state observation unit may receive the shape data of the core sheets from the robot vision system. The laminated core manufacturing apparatus may further include a robot control unit which issues a command of one of a displacement and an angle of the hand portion to control an operation of the robot, and the state observation unit may receive from the robot control unit, the operation data of the laminated core manufacturing apparatus, and the time data for stacking the core sheets.

The state observation unit may obtain a velocity gain and a position gain of the hand portion output from the robot control unit and data of a time in which the core sheets are stacked. The machine learning device may further include a decision unit which decides an operation of the laminated core manufacturing apparatus by referring to the manipulated variable learned by the learning unit.

The learning unit may include a reward computation unit which computes a reward on the basis of output from the state observation unit; and a value function update unit which updates a value function for determining a value of the operation for stacking the core sheets to manufacture a laminated core, in accordance with the reward on the basis of outputs from the state observation unit and the reward computation unit.

The learning unit may include an error computation unit which computes an error on the basis of output from the state observation unit and input teacher data; and an error model update unit which updates an error model for determining an error of the operation for stacking the core sheets to manufacture a laminated core, on the basis of outputs from the state observation unit and the error computation unit. The machine learning device is preferable to further include a neural network.

According to a second aspect of the present invention, there is provided a laminated core manufacturing apparatus which stacks core sheets having a predetermined shape one by one or in groups of at least two to manufacture a laminated core, wherein the laminated core manufacturing apparatus manufactures the laminated core by detecting dimensions of the core sheets using a robot vision system attached to a hand portion which grips the core sheets. The laminated core manufacturing apparatus may further include a machine learning device.

According to a third aspect of the present invention, there is provided a laminated core manufacturing system including a plurality of laminated core manufacturing apparatuses which stacks core sheets having a predetermined shape one by one or in groups of at least two to manufacture a laminated core, wherein the laminated core manufacturing apparatus manufactures the laminated core by detecting dimensions of the core sheets using a robot vision system attached to a hand portion which grips the core sheets. The laminated core manufacturing apparatus may further include a machine learning device, wherein the machine learning device is mounted in each of the laminated core manufacturing apparatuses, and the plurality of machine learning devices mounted in the plurality of laminated core manufacturing apparatuses, respectively, are configured to share or exchange data with one another via a communication medium. The machine learning device may be located on a cloud server.

According to a fourth aspect of the present invention, there is provided a machine learning method for learning an operation of a laminated core manufacturing apparatus for stacking a plurality of core sheets to manufacture a laminated core, the method including observing states of the core sheets and the laminated core manufacturing apparatus; and updating a manipulated variable for stacking the core sheets, on the basis of a state variable obtained in the observing. The observing the states of the core sheets and the laminated core manufacturing apparatus may include observing a state variable representing at least one of shape data of the core sheets, operation data of the laminated core manufacturing apparatus, and time data for stacking the core sheets by the laminated core manufacturing apparatus, and updating the manipulated variable for stacking the core sheets is performed on the basis of the observed state variable representing the at least one of the shape data of the core sheets, the operation data of the laminated core manufacturing apparatus, and the time data for stacking the core sheets.

BRIEF DESCRIPTION OF THE DRAWINGS

The present invention will be more clearly understood by reference to the accompanying drawings, in which.

DETAILED DESCRIPTION

Figure 7:
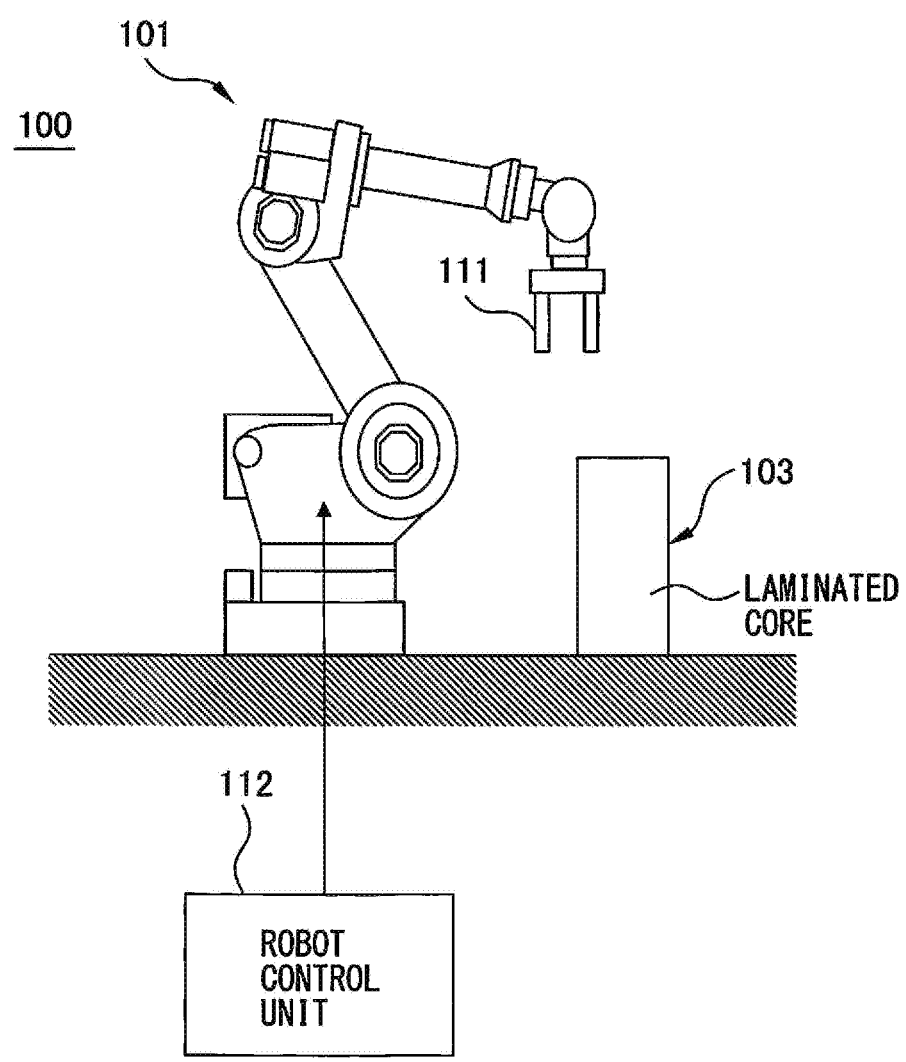
FIG. 7 is a block diagram schematically illustrating an exemplary laminated core manufacturing apparatus.
Figure 8:
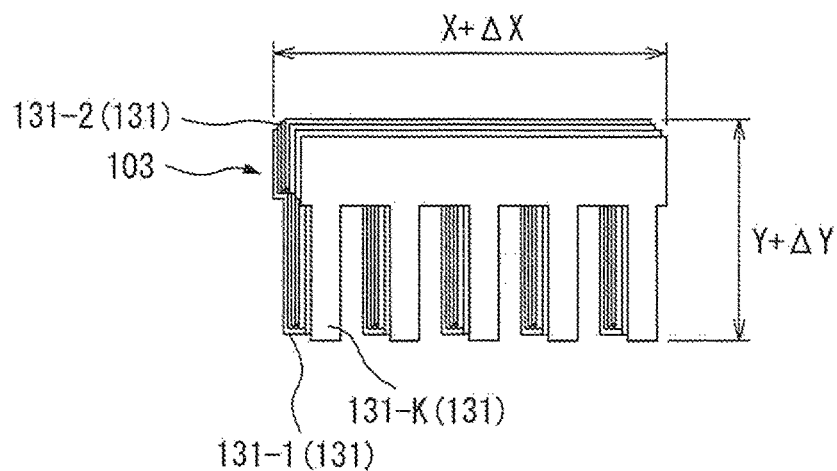
FIG. 8 is a view for explaining an example of the manufacture of a laminated core by the laminated core manufacturing apparatus illustrated as FIG. 7.

Before a detailed description of an embodiment of a machine learning device, a laminated core manufacturing apparatus, a laminated core manufacturing system, and a machine learning method according to the present invention, an exemplary laminated core manufacturing apparatus and its problem will be described first with reference to FIG. 7 to FIG. 9. FIG. 7 is a block diagram schematically illustrating an exemplary laminated core manufacturing apparatus, and FIG. 8 is a view for explaining an example of the manufacture of a laminated core by the laminated core manufacturing apparatus illustrated as FIG. 7. Referring to FIG. 7, reference numeral 100 denotes a laminated core manufacturing apparatus; 101, a robot (task robot); 111, a hand portion of the robot 101; 112, a robot control unit which controls the robot 101; and 103, a laminated core.

As illustrated as FIG. 7, according to this embodiment, a laminated core 103 is manufactured by, e.g., stacking a plurality of core sheets 131-1, 131-2, ..., 131-k, as depicted as FIG. 8, using the hand portion 111 of the robot 101 controlled by the output of the robot control unit 112. The robot 101 is implemented in, e.g., a six-axis multi-articulated robot and the respective drive shafts of the robot 101 and the hand portion 111 are controlled by the robot control unit 112.

The robot 101, for example, grips and stacks core sheets 131 (131-1, 131-2, ..., 131-k) from predetermined portions to manufacture a laminated core 103. Core sheets 131 are stacked using the robot 101 by, e.g., gripping the core sheets 131 with its hand portion 111 using a teach pendant (not illustrated) and storing the moving path and the like in the robot control unit 112, or causing the robot control unit 112 to execute a predetermined program for gripping, moving, and stacking the core sheets 131.

In the above-mentioned method for manufacturing a laminated core 103, however, since the positions of a plurality of core sheets 131-1, 131-2, ..., 131-k to be stacked vary, the manufactured laminated core 103 includes the error ranges of, e.g., X+ΔX and Y+ΔY, as illustrated as FIG. 8.

Figure 9:
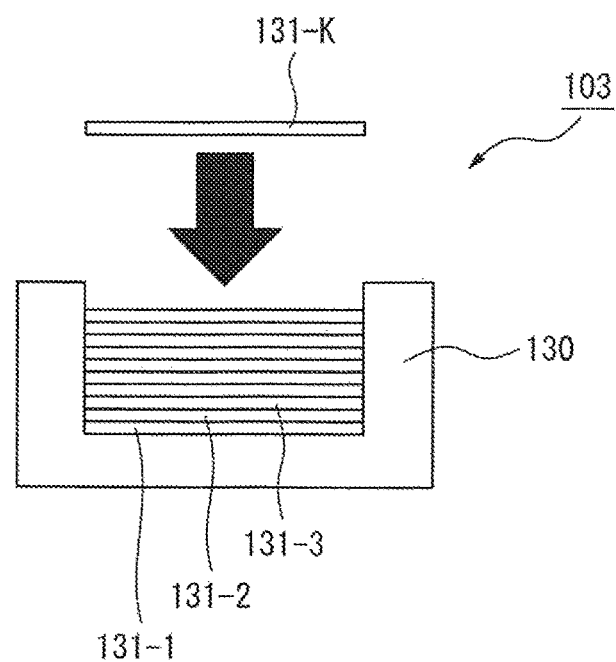
FIG. 9 is a view for explaining another example of the manufacture of a laminated core by the laminated core manufacturing apparatus illustrated as FIG. 7.

FIG. 9 is a view for explaining another example of the manufacture of a laminated core by the laminated core manufacturing apparatus illustrated as FIG. 7, and illustrates the manufacture of a laminated core 103 using a mold jig 130. In other words, in the manufacture of a laminated core according to this method, after a plurality of core sheets 131-1, 131-2, ..., 131-k are stacked inside the mold jig 130, the dimensional variations in the stacked state are kept small, as illustrated as FIG. 9. However, a plurality of mold jigs 130 are provided because a different mold jig 130 is used for each type of laminated core 103 to be manufactured. In addition, the use of the same mold jigs 130 over an extended period of time results in subtle changes in their dimension and shape and, in turn, influences the shape of manufactured laminated cores 103.

In this manner, when a laminated core 103 is manufactured by the laminated core manufacturing apparatus 100 as illustrated as FIG. 7, it is difficult to design a high-quality laminated core 103 without the mold jig 130. Even when a laminated core 103 is manufactured using the mold jig 130, it is difficult to manufacture laminated cores 103 with the same quality over a long period of time, and various problems, such as providing a specific mold jig 130 for each type of laminated core 103 to be manufactured, are encountered.

An embodiment of a machine learning device, a laminated core manufacturing apparatus, a laminated core manufacturing system, and a machine learning method according to the present invention will be described in detail below with reference to the accompanying drawings. In the drawings, the same reference numerals denote the same members. Further, the same reference numerals in different drawings denote components having the same functions. To facilitate understanding, these drawings use different scales as appropriate.

Figure 1:
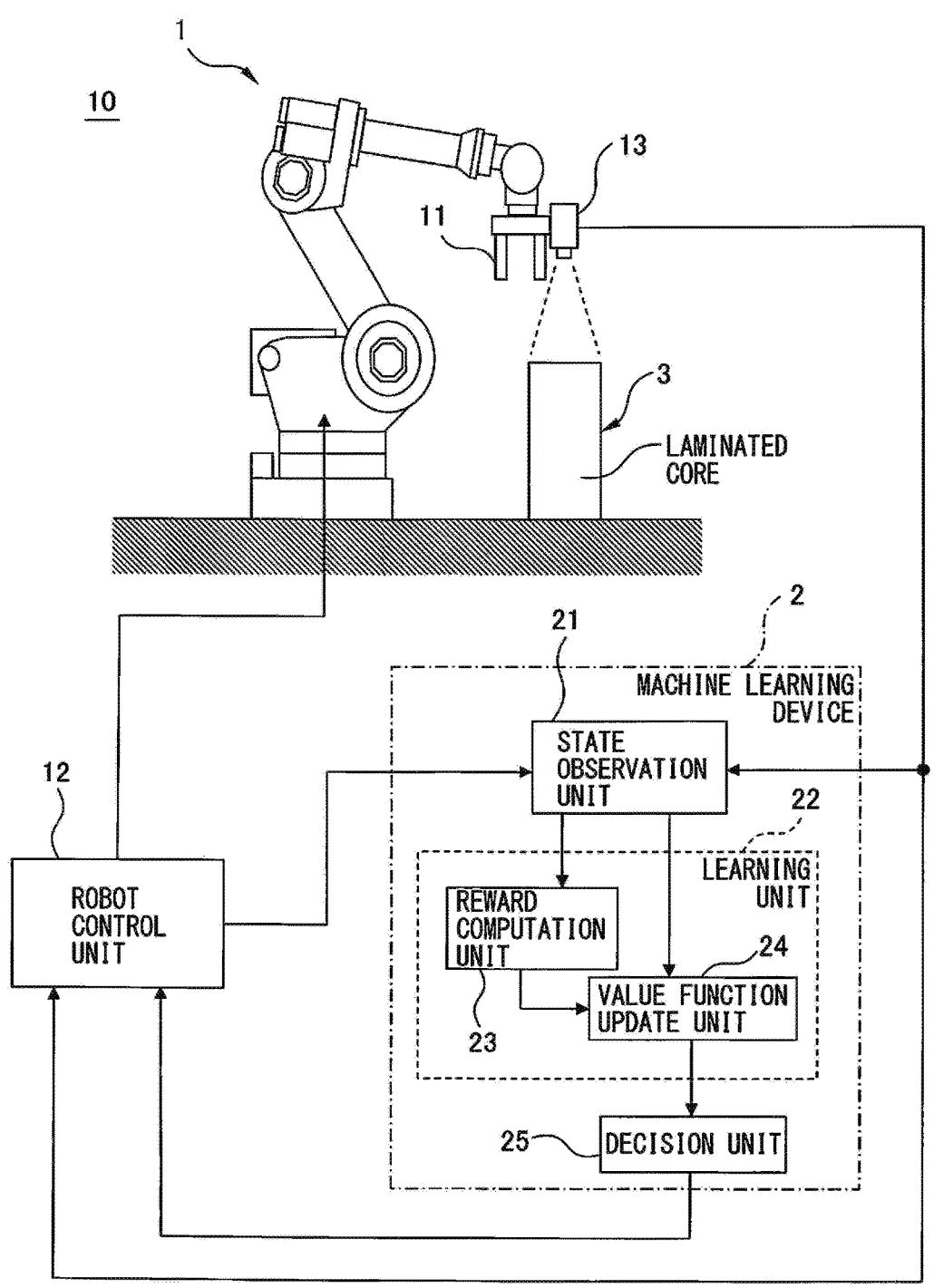
FIG. 1 is a block diagram schematically illustrating an embodiment of a laminated core manufacturing apparatus according to the present invention.
Figure 2:
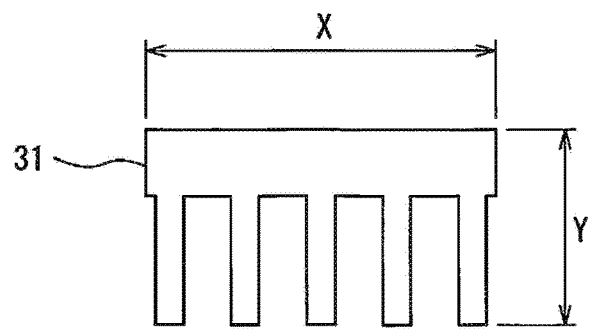
FIG. 2 is a view illustrating an exemplary core sheet shape obtained by a robot vision system in the laminated core manufacturing apparatus illustrated as FIG. 1.

FIG. 1 is a block diagram schematically illustrating an embodiment of a laminated core manufacturing apparatus according to the present invention, and FIG. 2 is a view illustrating an exemplary core sheet shape obtained by a robot vision system in the laminated core manufacturing apparatus illustrated as FIG. 1. A laminated core manufacturing apparatus 10 according to this embodiment includes a robot 1 including a hand portion 11, a machine learning device 2, a robot control unit 12, and a robot vision system 13, as illustrated as FIG. 1. The robot 1 is implemented in, e.g., a six-axis multi-articulated robot and the respective drive shafts of the robot 1 and the hand portion 11 are controlled by the robot control unit 12.

The robot 1 grips and stacks core sheets 31 one by one or in groups of at least two to manufacture a laminated core 3. Although FIG. 1 depicts the hand portion 11 designed to grip the core sheets 31 with its two fingers, the hand portion 11 may use, e.g., a suction hand which draws the core sheets 31 by suction with a negative pressure. The hand portion 11 includes a robot vision system 13, which can recognize the shape of the core sheets 31, i.e., detect the X- and Y-dimensions and the like of the core sheets 31, as illustrated as FIG. 2.

The attachment area of the robot vision system 13 is set to the hand portion 11 in FIG. 1, but this is merely an example, and this attachment area is not limited to the hand portion 11 as long as it provides a broad view of a workspace. Further, the number of robot vision systems 13 to be located is not limited to one, and a robot vision system 13 may be located in a plurality of areas or a plurality of robot vision systems 13 may be provided, as a matter of course.

The robot control unit 12 issues a command of the displacement or angle of the hand portion 11 to control the operation of the robot 1. A state observation unit 21 receives at least one of shape data of the core sheets 31 from the robot vision system 13, and operation data of the laminated core manufacturing apparatus 10 (robot 1) and time data for stacking the core sheets 31 from the robot control unit 12. In other words, the state observation unit 21 obtains the velocity gain and position gain of the hand portion 11 and data representing the time for which the core sheets 31 are stacked, output from the robot control unit 12.

The machine learning device 2 is used to learn the operation of the laminated core manufacturing apparatus 10, and includes a state observation unit 21 which observes the states of the core sheets 31 and the laminated core manufacturing apparatus 10, a learning unit 22 which updates a manipulated variable for stacking the core sheets 31, on the basis of state variables observed by the state observation unit 21, and a decision unit 25 which decides the operation of the laminated core manufacturing apparatus 10 by referring to the manipulated variable learned by the learning unit 22.

The learning unit 22 updates the manipulated variable for stacking the core sheets 31, on the basis of the state variable (state quantity) representing at least one of the shape data of the core sheets 31, the operation data of the laminated core manufacturing apparatus 10, and the time data for stacking the core sheets 31, observed by the state observation unit 21. In other words, the learning unit 22 includes a reward computation unit 23 which computes a reward on the basis of output from the state observation unit 21, and a value function update unit 24 which updates a value function for determining the value of the operation for stacking the core sheets 31 to manufacture a laminated core 3, in accordance with the reward on the basis of outputs from the state observation unit 21 and the reward computation unit 23. The decision unit 25 decides the operation of the laminated core manufacturing apparatus 10 (robot 1) by referring to the manipulated variable learned by the learning unit 22 and outputs it to the robot control unit 12. Thus, the robot control unit 12 controls the hand portion 11 (robot 1) on the basis of the velocity gain (updated value) and the position gain (updated value) according to the updated value function to stack the core sheets 31 to manufacture a laminated core 3.

A machine learning device will be described hereinafter. The machine learning device has the function of extracting, e.g., a useful rule, a knowledge representation, and a determination criterion based on analysis of a set of data input to the device, outputting the determination results, and learning knowledge (machine learning). There are a variety of machine learning techniques, which are roughly classified into, e.g., "supervised learning," "unsupervised learning," and "reinforcement learning." To implement these techniques, another technique referred to as "deep learning" in which extraction of feature amounts themselves is learned is available.

The machine learning device 2 illustrated as FIG. 1 employs "reinforcement learning" and a machine learning device 4 (to be described later with reference to FIG. 6) employs "supervised learning." Although these types of machine learning (machine learning devices 2 and 4) may use a general-purpose computer or processor, the use of, e.g., GPGPUs (General-Purpose computing on Graphics Processing Units) or large-scale PC clusters allows higher-speed processing.

First, in supervised learning, a large number of sets of teacher data, i.e., data of certain inputs and results (labels) are fed into the machine learning device 2, which learns features observed in these data sets and inductively acquires a model (error model) for estimating the result from the input, i.e., their relationship. Supervised learning can be implemented using an algorithm such as a neural network (to be described later).

In unsupervised learning, only input data are fed in large amounts into a learning device, which learns the distribution of the input data to, e.g., compress, classify, and shape the input data without corresponding teacher output data. This allows, e.g., clustering of features seen in these data sets into similar features. The obtained result can be used to define certain criteria and allocate outputs in an optimizing manner according to the criteria, thus predicting output.

Intermediate problem setting between unsupervised learning and supervised learning, referred to as semi-supervised learning, is also available to define certain criteria and allocate outputs in an optimizing manner according to the criteria and applies when, for example, only some data serve as data sets of inputs and outputs and the remaining data include only inputs. In this embodiment, learning can be efficiently performed by applying data (e.g., image data or simulation data) which can be obtained even without actual movement of the robot to unsupervised learning.

Reinforcement learning will be described below. Reinforcement learning problem setting will be considered as follows:

The robot observes the environmental state to decide its action;

The environment may change according to a certain rule and the robot may change the environment by its own action;

A reward signal is returned every time action is taken;

The sum of (discount) rewards in the future is to be maximized;

Learning starts in a state in which a result to be brought about by the action is totally unknown or known only incompletely. In other words, the robot can obtain the result of an action as data only after it actually takes action. This means that an optimal action may be preferably searched for by trial and error; and Learning can be started at a good starting point by starting from the state in which learning has been performed in advance to imitate human behaviors (a technique such as the above-mentioned supervised learning or reverse reinforcement learning).

In reinforcement learning, in addition to determination and classification, an action is learned to acquire a method for learning an appropriate action in consideration of interactions exerted on the environment by the action, i.e., learning to maximize the reward to be obtained in the future. Although this description will be followed by an example of Q-learning, the present invention is not limited to Q-learning.

In Q-learning, a value Q(s, a) of selection of an action a is learned in a particular environmental state s. In other words, an action a having the highest value Q(s, a) in the particular state s may be preferably selected as an optimal action. However, at first, a correct value Q(s, a) is totally unknown for a pair of a state s and an action a. The agent (the subject of an action) selects various actions a in the particular state s and rewards are offered for the actions a. With this operation, the agent learns to select a better action, i.e., a correct value Q(s, a).

To maximize the sum of rewards to be obtained in the future as a result of the actions, $Q(s, a)=E[\Sigma(\gamma^t)r_t]$ is to be finally satisfied, where E[ ] is the expected value, t is time, $\gamma$ is a parameter referred to as the discount rate (to be described later), $r_t$ is the reward at time t, and $\Sigma$ is the sum at time t. The expected value in this expression is taken in response to a change in state that follows an optimal action and is an unknown value, which is learned by a search. An update expression of such a value Q(s, a) is given by, e.g.:

$$Q(s_t, a_t) \leftarrow Q(s_t, a_t) + \alpha\left(r_{t+1} + \gamma \max_a Q(s_{t+1}, a) - Q(s_t, a_t)\right) \quad (1)$$

where $s_t$ is the environmental state at time t and $a_t$ is the action at time t. Upon the action $a_t$, the state changes to $s_{t+1}$. $r_{t+1}$ is the reward received upon a change in state. The term attached with max is the product of the Q-value multiplied by $\gamma$ when an action a having the highest Q-value known in the state $s_{t+1}$ is selected. $\gamma$ is a parameter referred to as the discount rate, satisfying $0<\gamma\le1$. $\alpha$ is a learning factor satisfying $0<\alpha\le1$.

Expression (1) represents a method for updating the evaluation value $Q(s_t, a_t)$ of the action $a_t$ in the state $s_t$, based on the reward $r_{t+1}$ returned as a result of the trial $a_t$. More specifically, when the sum of the reward $r_{t+1}$ and the evaluation value $Q(s_{t+1}, \max a_{t+1})$ of the best action max a in the state subsequent to the state s upon the action a is greater than the evaluation value $Q(s_t, a_t)$ of the action a in the state s, $Q(s_t, a_t)$ is increased; otherwise, $Q(s_t, a_t)$ is reduced. In other words, the value of a particular action in a particular state is brought close to the reward immediately returned as a result, and the value of the best action in the subsequent state upon the particular action.

Methods for representing Q (s, a) on the computer include a method for holding the numerical values of all state-action pairs (s, a) in the form of a table and a method for providing a function that approximates Q(s, a). With the latter method, above-mentioned expression (1) can be implemented by adjusting the parameter of an approximation function using a technique such as the stochastic gradient descent method. A neural network (to be described later) can be used as the approximation function.

Figure 3:
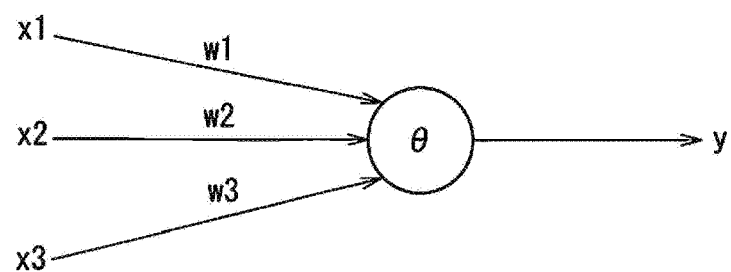
FIG. 3 is a diagram schematically representing a model for a neuron.
Figure 4:
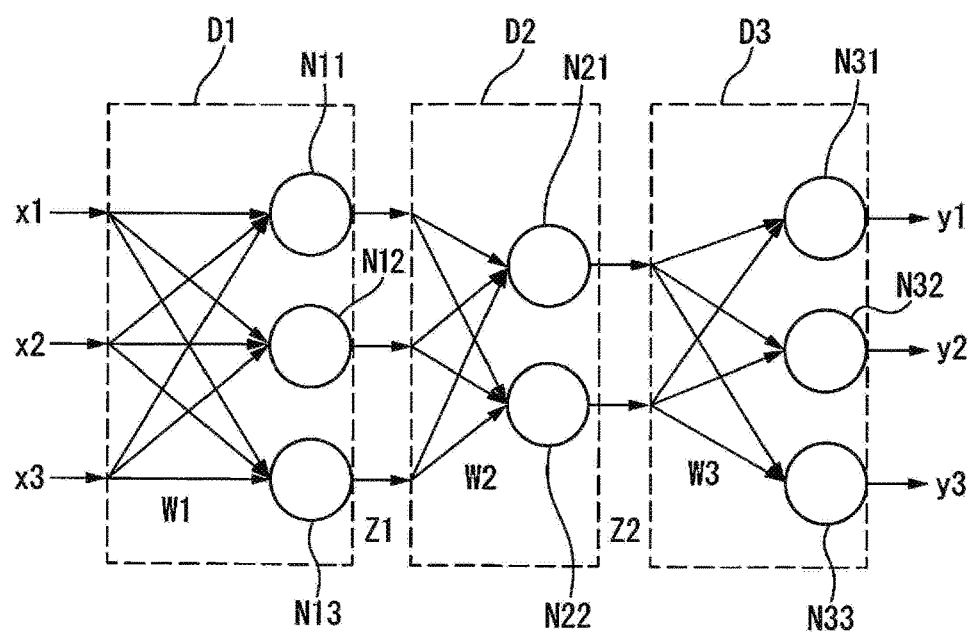
FIG. 4 is a diagram schematically representing a three-layer neural network formed by combining neurons as illustrated as FIG. 3 together.

Neural networks can also be used as error models for supervised learning and unsupervised learning or approximation algorithms for value functions in reinforcement learning. FIG. 3 is a diagram schematically representing a model for a neuron, and FIG. 4 is a diagram schematically representing a three-layer neural network formed by combining neurons as illustrated as FIG. 3 together. More specifically, the neural network is implemented by, e.g., an arithmetic device imitating a model for a neuron as illustrated as, e.g., FIG. 3, and a memory.

As illustrated as FIG. 3, the neurons serve to output an output (result) y for a plurality of inputs x (FIG. 3 illustrates inputs x1 to x3 as an example). Each input x (x1, x2, x3) is multiplied by a weight w (w1, w2, w3) corresponding to the input x. With this operation, the neurons output results y given by:

$$y = f_k(\Sigma_{i=1}^n x_i w_i - \theta) \quad (2)$$

where $\theta$ is the bias and $f_k$ is the activation function. Note that all of the input x, the result y, and the weight w are vectors.

A three-layer neural network formed by combining neurons as illustrated as FIG. 3 together will be described below with reference to FIG. 4. A plurality of inputs x (inputs x1 to x3 are taken as an example herein) are input from the left of the neural network and results y (results y1 to y3 are taken as an example herein) are output from the right of this network, as illustrated as FIG. 4. More specifically, the inputs x1, x2, and x3 are multiplied by a weight corresponding to each of three neurons N11 to N13 and are then input to the neurons. The weights used to multiply these inputs are collectively denoted by W1 herein.

The neurons N11 to N13 output z11 to z13, respectively. Referring to FIG. 4, z11 to z13 are collectively referred to as feature vectors Z1 and may be regarded as vectors obtained by extracting the feature amounts of input vectors. The feature vectors Z1 are defined between the weights W1 and W2. z11 to z13 are multiplied by a weight corresponding to each of two neurons N21 and N22 and are then input to the neurons. The weights used to multiply these feature vectors are collectively denoted by W2 herein.

The neurons N21 and N22 output z21 and z22, respectively. Referring to FIG. 4, z21 and z22 are collectively referred to as feature vectors Z2. The feature vectors Z2 are defined between the weights W2 and W3. z21 and z22 are multiplied by a weight corresponding to each of three neurons N31 to N33 and are then input to the neurons. The weights used to multiply these feature vectors are collectively denoted by W3 herein.

Lastly, the neurons N31 to N33 output results y1 to y3, respectively. The operation of the neural network includes a learning mode and a value prediction mode. For example, the weight W is learned using a learning data set in the learning mode, and a robot action is determined in the prediction mode using the parameter. Although "prediction" has been referred to above for the sake of convenience, a variety of tasks such as detection, classification, and inference are possible, as a matter of course.

Data obtained by actually operating the robot in the prediction mode can be immediately learned and reflected on the subsequent action (online learning), or a group of data collected in advance can be used to perform collective learning and to subsequently execute the detection mode using the same parameters (batch learning). As another, intermediate approach, the learning mode can be interposed every time a certain amount of data is accumulated.

The weights W1 to W3 can be learned by the error backpropagation method. The information of errors enters from the right and flows to the left. The error backpropagation method is used to adjust (learn) each weight to reduce the difference between the true output y (teacher) and the output y when the input x is input.

Such a neural network can have more than three layers (referred to as deep learning). It is possible to automatically acquire from only teacher data an arithmetic device which extracts features of the input stepwise and returns a result. In view of this, the machine learning device 2 according to this embodiment includes a state observation unit 21, a learning unit 22, and a decision unit 25 to execute above-mentioned Q-learning, as illustrated as FIG. 1. However, the machine learning method applied to the present invention is not limited to Q-learning, as mentioned earlier. In other words, various techniques such as "supervised learning," "unsupervised learning," "semi-supervised learning," and "reinforcement learning" that can be used by the machine learning device are applicable.

Figure 5:
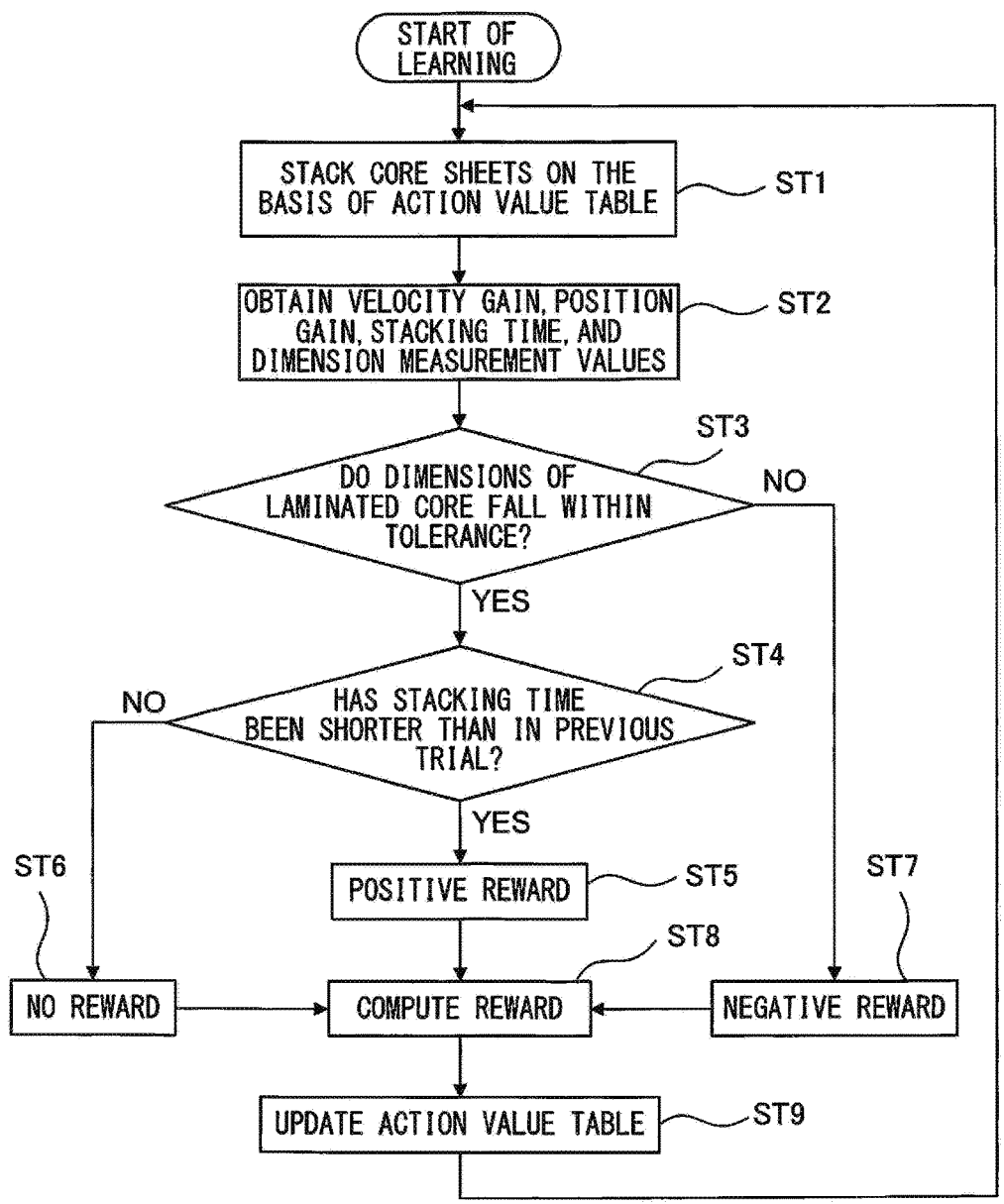
FIG. 5 is a flowchart illustrating an exemplary operation of a machine learning device in the laminated core manufacturing apparatus illustrated as FIG. 1.

An exemplary operation of the machine learning device 2 in the laminated core manufacturing apparatus according to this embodiment will be described below. FIG. 5 is a flowchart illustrating an exemplary operation of a machine learning device in the laminated core manufacturing apparatus illustrated as FIG. 1. As illustrated as FIG. 5, when machine learning is started (at the start of learning), core sheets 31 are stacked on the basis of the action value table (step ST1). In other words, the robot control unit 12 issues a command of, e.g., the displacement or angle (manipulated variable) of the hand portion 11 on the basis of the velocity gain and the position gain according to the action value table (value function) to cause the robot 1 to perform processing for stacking core sheets 31.

The state observation unit 21, for example, obtains from the robot control unit 12, pieces of information concerning the velocity gain, the position gain, and the stacking time, and dimension measurement values based on output from the robot vision system 13 (step ST2). The state observation unit 21 then determines whether the dimensions of the core sheets 31 fall within a tolerance (step ST3) and whether the stacking time has been shorter than in the previous trial (step ST4). In other words, when it is determined in step ST3 that the dimensions of the core sheets 31 fall outside the tolerance (NO in step ST3), the process advances to step ST7, in which a negative reward is set; otherwise (YES in step ST3), the process advances to above-mentioned step ST4, in which it is determined whether the time taken to stack core sheets 31 has been shorter than in the previous trial.

In other words, when it is determined in step ST4 that the stacking time has been shorter than in the previous trial (YES in step ST4), the process advances to step ST5, in which a positive reward is set; otherwise (NO in step ST4), the process advances to step ST6, in which "no reward" (zero reward) is set. In step ST8, reward computation based on the "positive reward," "no reward," and "negative reward" in steps ST5 to ST7 is performed to update the action value table (step ST9) and the process returns to step ST1, in which the same processing is repeated. Thus, high-quality laminated cores can be continuously manufactured over a long period of time.

In the foregoing description, the number of core sheets 31 to be stacked by the hand portion 11 is not limited to one. In other words, with one operation of the hand portion 11, core sheets 31 having a predetermined shape are stacked one by one or in groups of at least two to manufacture a laminated core. The hand portion 11 for stacking core sheets 31 is not limited to that which grips one or more core sheets 31 with its two fingers as illustrated as FIG. 1, as described earlier.

The state variables obtained (observed) by the state observation unit 21 are not limited to the velocity gain, the position gain, the stacking time, and the dimension measurement values described above, but may include various other data. In addition, the dimension measurement values of the core sheets 31 can be obtained from, e.g., image data captured by the robot vision system 13, and various known processes are applicable in this case. The values of the "positive reward," "no reward," and "negative reward" in steps ST5 to ST7 may be naturally determined by selecting appropriate values in accordance with a variety of conditions (e.g., the tolerance value, and the shape, material, and precision of core sheets).

Figure 6:
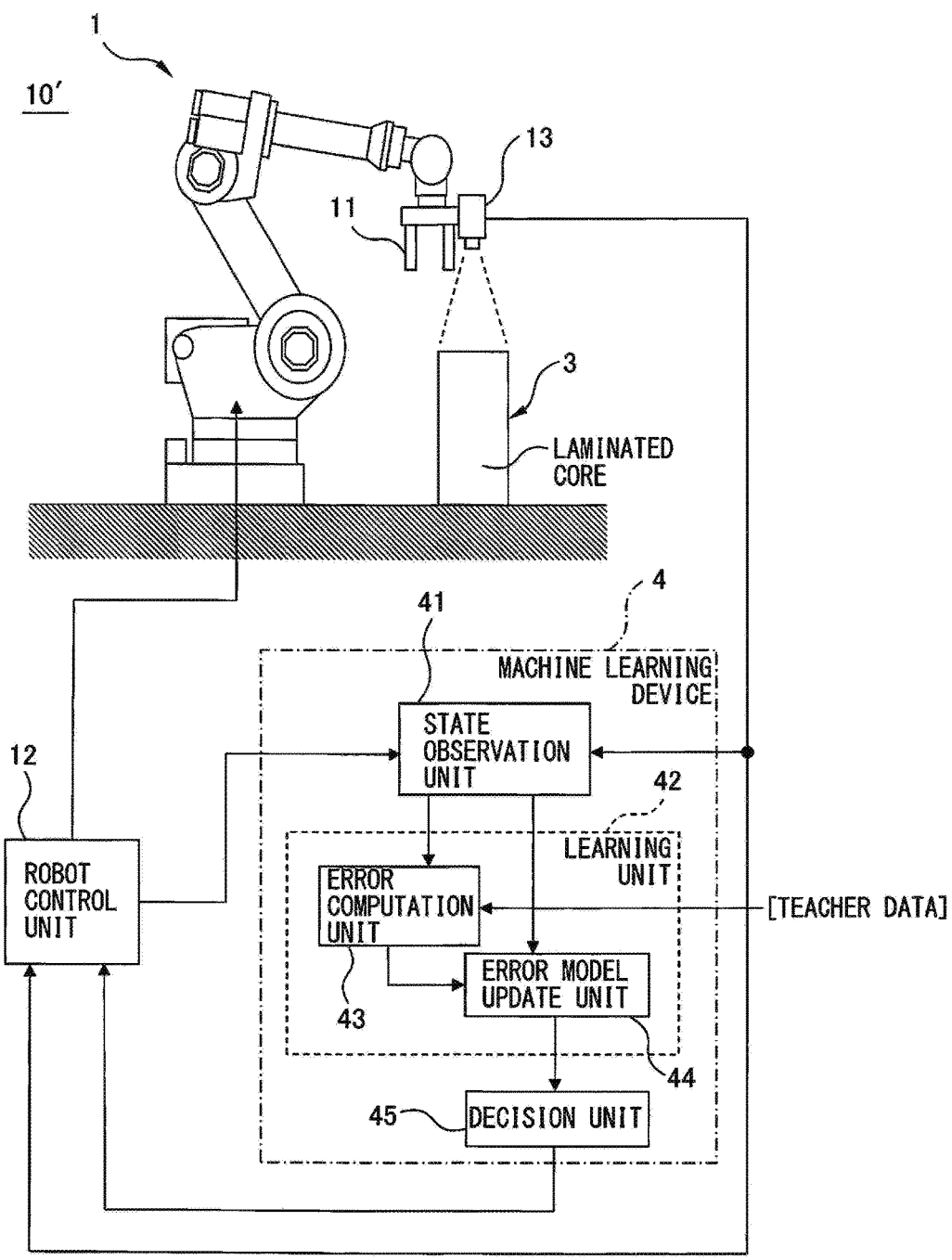
FIG. 6 is a block diagram schematically illustrating another embodiment of a laminated core manufacturing apparatus according to the present invention.

FIG. 6 is a block diagram schematically illustrating another embodiment of a laminated core manufacturing apparatus according to the present invention, and illustrates a laminated core manufacturing apparatus that employs supervised learning. As is obvious from a comparison of FIG. 6 with FIG. 1 mentioned earlier, a laminated core manufacturing apparatus 10' that employs supervised learning illustrated as FIG. 6 is provided with teacher data (result (label)-bearing data) with respect to the laminated core manufacturing apparatus 10 that employs Q-learning (reinforcement learning) illustrated as FIG. 1.

A machine learning device 4 in the laminated core manufacturing apparatus 10' that employs supervised learning includes a state observation unit 41, a learning unit 42, and a decision unit 45, as illustrated as FIG. 6. The learning unit 42 includes an error computation unit 43 and an error model update unit 44. In the laminated core manufacturing apparatus 10' according to this embodiment as well, the machine learning device 4 learns and outputs a manipulated variable such as the displacement or angle of the hand portion 11 on the basis of the velocity gain and the position gain according to the action value table (value function).

In other words, in the laminated core manufacturing apparatus 10' that employs supervised learning illustrated as FIG. 6, the error computation unit 43 and the error model update unit 44 correspond to the reward computation unit 23 and the value function update unit 24, respectively, in the laminated core manufacturing apparatus 10 that employs Q-learning (reinforcement learning) illustrated as FIG. 1. Other configurations such as the configurations of, e.g., the robot 1, the robot control unit 12, and the robot vision system 13 are the same as described above with reference to FIG. 1, and description thereof will be omitted. The decision unit 45 is the same as that illustrated as FIG. 1, and description thereof will be omitted. Referring to FIG. 6 as well, the attachment area of the robot vision system 13 is not limited to the hand portion 11, and the robot vision system 13 may be attached to an area which provides a broad view of a workspace. The number of robot vision systems 13 is not limited to one, and a robot vision system 13 may be located in a plurality of areas or a plurality of robot vision systems 13 may be provided.

The error computation unit 43 receives teacher data and output of the state observation unit 41 and computes the error between the result (label)-bearing data and the output of an error model implemented in the learning unit 42. As the teacher data, when, for example, the shape of the core sheets 31 (laminated core 3) and the processes by the robot 1 are the same, result (label)-bearing data obtained by the day before a predetermined day on which the robot 1 performs a task can be held and provided to the error computation unit 43 on the predetermined day.

Alternatively, data obtained through, e.g., simulation performed outside the laminated core manufacturing apparatus 10' or result (label)-bearing data obtained by another laminated core manufacturing apparatus may be provided to the error computation unit 43 of the laminated core manufacturing apparatus 10' via a memory card or a communication line. Further, the result (label)-bearing data (teacher data) can be held, for example, in a non-volatile memory such as a flash memory built into the learning unit 42 and be directly used in the learning unit 42.

Based on the foregoing description, a laminated core manufacturing system including a plurality of laminated core manufacturing apparatuses 10 (10') can be considered. In this case, for example, the machine learning device 2 (4) is mounted in each laminated core manufacturing apparatus 10 (10'), and the plurality of machine learning devices 2 (4) thus mounted in the plurality of laminated core manufacturing apparatuses 10 (10'), respectively, can share or exchange data with one another via a communication medium. Further, the machine learning device 2 (4) (the function of the machine learning device) can also be located on a cloud server.

A machine learning device, a laminated core manufacturing apparatus, a laminated core manufacturing system, and a machine learning method according to the present invention enables continuous manufacturing of high-quality laminated cores.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that various changes, substitutions, and alterations could be made hereto without departing from the spirit and scope of the invention.

What is claimed is:

1. A laminated core manufacturing apparatus, comprising:
   a robot having a hand portion configured to stack core sheets having a predetermined shape one by one or in groups of at least two core sheets to manufacture a laminated core; and
   a robot vision system attached to the hand portion, wherein
   the laminated core manufacturing apparatus is configured to manufacture the laminated core by stacking the core sheets based on
   (1) shape data of the core sheets detected by the robot vision system,
   (2) operation data of the laminated core manufacturing apparatus, and
   (3) time data for stacking the core sheets.

2. The laminated core manufacturing apparatus according to claim 1, further comprising:
   a machine learning device configured to learn an operation of the laminated core manufacturing apparatus, the machine learning device comprising:
   a state observation unit configured to observe states of the core sheets and the laminated core manufacturing apparatus; and
   a learning unit configured to update a manipulated variable for stacking the core sheets, on the basis of a state variable observed by the state observation unit, the state variable representing (1) the shape data of the core sheets, (2) the operation data of the laminated core manufacturing apparatus, and (3) the time data for stacking the core sheets.

3. A laminated core manufacturing system comprising a plurality of laminated core manufacturing apparatuses according to claim 2, wherein
   the machine learning device is mounted in each of the laminated core manufacturing apparatuses, and
   the plurality of machine learning devices mounted in the plurality of laminated core manufacturing apparatuses, respectively, are configured to share or exchange data with one another via a communication medium.

4. A laminated core manufacturing system comprising a plurality of laminated core manufacturing apparatuses according to claim 2, wherein
   the machine learning device of at least one of the plurality of laminated core manufacturing apparatuses is located on a cloud server.

5. A machine learning method of learning an operation of a laminated core manufacturing apparatus for stacking a plurality of core sheets to manufacture a laminated core, the method comprising:
   observing states of the core sheets and the laminated core manufacturing apparatus; and
   updating a manipulated variable for stacking the core sheets, on the basis of a state variable obtained in the observing, the state variable representing
   (1) shape data of the core sheets,
   (2) operation data of the laminated core manufacturing apparatus, and
   (3) time data for stacking the core sheets,
   wherein
   the laminated core manufacturing apparatus comprises a robot comprising a robot vision system attached to one of a hand portion and an area which provides a broad view of a workspace, and
   in said observing, the shape data of the core sheets are received from the robot vision system.

6. A machine learning device for learning an operation of a laminated core manufacturing apparatus for stacking a plurality of core sheets to manufacture a laminated core, wherein the machine learning device comprises:
   a state observation unit configured to observe states of the core sheets and the laminated core manufacturing apparatus; and
   a learning unit configured to update a manipulated variable for stacking the core sheets, on the basis of a state variable observed by the state observation unit, the state variable representing
   (1) shape data of the core sheets,
   (2) operation data of the laminated core manufacturing apparatus, and
   (3) time data for stacking the core sheets,
   wherein
   the laminated core manufacturing apparatus comprises a robot comprising a robot vision system attached to one of a hand portion and an area which provides a broad view of a workspace, and the state observation unit is configured to receive the shape data of the core sheets from the robot vision system.

7. The machine learning device according to claim 6, wherein
the laminated core manufacturing apparatus further comprises a robot control unit configured to issue a command of one of a displacement and an angle of the hand portion to control an operation of the robot, and
the state observation unit is configured to receive from the robot control unit, the operation data of the laminated core manufacturing apparatus, and the time data for stacking the core sheets.

8. The machine learning device according to claim 7, wherein the state observation unit is configured to obtain a velocity gain and a position gain of the hand portion output from the robot control unit and the time data for stacking the core sheets.

9. The machine learning device according to claim 6, further comprising:
a decision unit configured to decide an operation of the laminated core manufacturing apparatus by referring to the manipulated variable learned by the learning unit.

10. The machine learning device according to claim 6, wherein the learning unit comprises:
a reward computation unit configured to compute a reward on the basis of output from the state observation unit; and
a value function update unit configured to update a value function for determining a value of the operation for stacking the core sheets to manufacture a laminated core, in accordance with the reward on the basis of outputs from the state observation unit and the reward computation unit.

11. The machine learning device according to claim 6, wherein the learning unit comprises:
an error computation unit configured to compute an error on the basis of output from the state observation unit and input teacher data; and
an error model update unit configured to update an error model for determining an error of the operation for stacking the core sheets to manufacture a laminated core, on the basis of outputs from the state observation unit and the error computation unit.

12. The machine learning device according to claim 6, wherein the machine learning device further comprises a neural network.

\* \* \* \* \*